US010894554B1

(12) United States Patent
MacKarvich

(10) Patent No.: US 10,894,554 B1
(45) Date of Patent: Jan. 19, 2021

(54) MOBILE ANCHOR CART

(71) Applicant: Charles J. MacKarvich, Atlanta, GA (US)

(72) Inventor: Charles J. MacKarvich, Atlanta, GA (US)

(*) Notice: Subject to any disclaimer, the term of this patent is extended or adjusted under 35 U.S.C. 154(b) by 0 days.

(21) Appl. No.: 16/510,478

(22) Filed: Jul. 12, 2019

(51) Int. Cl.
*B62B 5/04* (2006.01)
*B62B 1/00* (2006.01)
*A62B 35/00* (2006.01)
*E04G 21/32* (2006.01)
*B62B 1/10* (2006.01)

(52) U.S. Cl.
CPC .......... *B62B 5/049* (2013.01); *A62B 35/0068* (2013.01); *B62B 1/008* (2013.01); *B62B 1/10* (2013.01); *E04G 21/3276* (2013.01)

(58) Field of Classification Search
CPC ............ A62B 35/0068; A62B 35/0043; E04G 21/3223; E04G 21/3276; E04G 21/3238; B62B 5/049; B62B 1/10; B62B 1/008
USPC ................................................... 52/105, 165
See application file for complete search history.

(56) References Cited

U.S. PATENT DOCUMENTS

| 3,550,244 | A | * | 12/1970 | Utzy | B07C 5/04 |
| | | | | | 29/407.05 |
| 5,423,386 | A | * | 6/1995 | Lapearous | A01B 45/02 |
| | | | | | 172/22 |
| 7,032,710 | B2 | * | 4/2006 | Anderson | A62B 35/0068 |
| | | | | | 182/16 |
| 8,584,798 | B2 | * | 11/2013 | Stoffels | A62B 99/00 |
| | | | | | 182/3 |
| 9,186,529 | B2 | * | 11/2015 | Correia | E04G 21/3276 |
| 9,758,184 | B1 | * | 9/2017 | Vaverek | B62B 1/20 |
| 10,183,185 | B2 | * | 1/2019 | Carroccia | A62B 35/0006 |
| 10,456,608 | B2 | * | 10/2019 | Johanneck | A62B 35/0068 |
| 2007/0289811 | A1 | * | 12/2007 | Smith | A62B 35/04 |
| | | | | | 182/3 |
| 2009/0321184 | A1 | * | 12/2009 | Hamilton | A62B 99/00 |
| | | | | | 182/3 |
| 2015/0104279 | A1 | * | 4/2015 | Kenton | E04G 21/3233 |
| | | | | | 414/460 |

FOREIGN PATENT DOCUMENTS

GB 2195299 A * 4/1988 ............. B62B 5/049

* cited by examiner

*Primary Examiner* — Adriana Figueroa
(74) *Attorney, Agent, or Firm* — Taylor English Duma LLP

(57) ABSTRACT

A mobile anchor cart assembly includes a cart including a frame defining a front side and a rear side, the front side disposed opposite from the rear side, the frame defining a front foot and a rear foot, the front foot and the rear foot configured to rest upon a ground surface when the cart is in an anchored position, the front foot and the rear foot configured to clear the ground surface when the cart is in a mobile position; at least one tie-off point attached to the frame; at least one handle extending outward from the rear side of the frame, the at least one handle configured to selectively position the cart about and between the anchored position and the mobile position; and an axle assembly mounted on the front side; and a load defining a load center of gravity.

20 Claims, 8 Drawing Sheets

MOBILE ANCHOR CART

TECHNICAL FIELD

This disclosure relates to anchoring for fall arrest and fall restraint safety systems. More specifically, this disclosure relates to a mobile anchor cart for fall arrest and fall restraint safety systems.

BACKGROUND

When workers are working at height or near drop-offs, labor regulations, such as those enforced by the Occupational Safety and Health Administration (OSHA), require that safety precautions be taken to protect the workers against falls. Two common fall protections are fall restraint systems and fall arrest systems ("fall protection systems" in general). Fall restraint systems are utilized to keep workers away from a potential fall hazard, such as an unprotected ledge. The workers may wear harnesses with fixed-length lanyards which are strategically anchored to prevent the worker from approaching the ledge while still allowing the worker to move about the worksite. By "restraining" the worker from approaching the ledge, the worker is prevented from possibly falling off of the ledge.

By contrast, fall arrest systems are intended to safely stop, or "arrest", a worker's freefall after the worker has already fallen over the fall hazard. The fall arrest system prevents the worker from striking a lower surface, such as the ground. The fall arrest system also absorbs the shock of the fall by decelerating the worker in a controlled manner, such as with a tear tape webbing pack or self-retracting lanyard.

Both fall arrest and fall restraint systems depend upon the presence of strong and reliable anchor points to function as intended. In existing facilities, particularly industrial facilities, anchor points may be incorporated directly into the structure itself. However, residential or commercial properties such as apartment buildings, hotels, and office buildings may be less likely to provide anchor points for aesthetic reasons. Also, during the construction of facilities, anchor points may not be easily provided. For example, during the construction of a multi-floor commercial building, the floors are frequently formed from flat slabs of poured concrete. These slabs do not provide any convenient place to attach a lanyard, without permanently damaging the floor by digging or penetrating into its surface.

Another consideration is that workers often must cover large areas during the course of their work, often in multiple directions relative to potential anchor points. For example, glaziers and other workers must install windows around the perimeter of each floor in many office buildings, hotels, or similar developments. These workers must be able to move efficiently from room to room or office to office to install these structures While doing so, the workers' fall protection systems must be properly anchored to work by the open window frames in each location. Some portable systems rely upon weight to provide a mobile anchor point; however, these systems can be too heavy for a single worker to move by himself or herself.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a mobile anchor cart assembly comprising a cart comprising a frame defining a front side and a rear side, the front side disposed opposite from the rear side, the frame defining a front foot and a rear foot, the front foot and the rear foot configured to rest upon a ground surface when the cart is in an anchored position, the front foot and the rear foot configured to clear the ground surface when the cart is in a mobile position; at least one tie-off point attached to the frame; at least one handle extending outward from the rear side of the frame, the at least one handle configured to selectively position the cart about and between the anchored position and the mobile position; and an axle assembly mounted on the front side; and a load defining a load center of gravity, the load center of gravity being vertically aligned with the axle assembly when the cart is in the anchored position.

Also disclosed a cart comprising a frame defining a front side and a rear side, the front side disposed opposite from the rear side, the frame defining a front foot and a rear foot, the front foot and the rear foot configured to rest upon a ground surface when the cart is in an anchored position, the front foot and the rear foot configured to clear the ground surface when the cart is in a mobile position; at least one tie-off point attached to the frame; at least one handle extending outward from the rear side of the frame, the at least one handle configured to selectively position the cart about and between the anchored position and the mobile position; and an axle assembly mounted on the front side.

Also disclosed is a method for using a mobile anchor cart assembly, the method comprising moving a cart of the mobile anchor cart assembly to a worksite in a mobile position, the cart rolling on at least one wheel of the cart in the mobile position, the cart comprising a frame and a first tie-off point attached to a first side of the frame, a first direction extending perpendicularly outward from the first side of the frame, a first directional work zone corresponding to the first direction; directing the first directional work zone toward a fall hazard of the worksite; repositioning the cart from the mobile position to an anchored position, the frame comprising a front foot and a rear foot, the front foot and the rear foot resting on a ground surface of the worksite in the anchored position, the at least one wheel raised above the ground surface in the anchored position; and attaching a fall protection system of a first worker to the first tie-off point.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
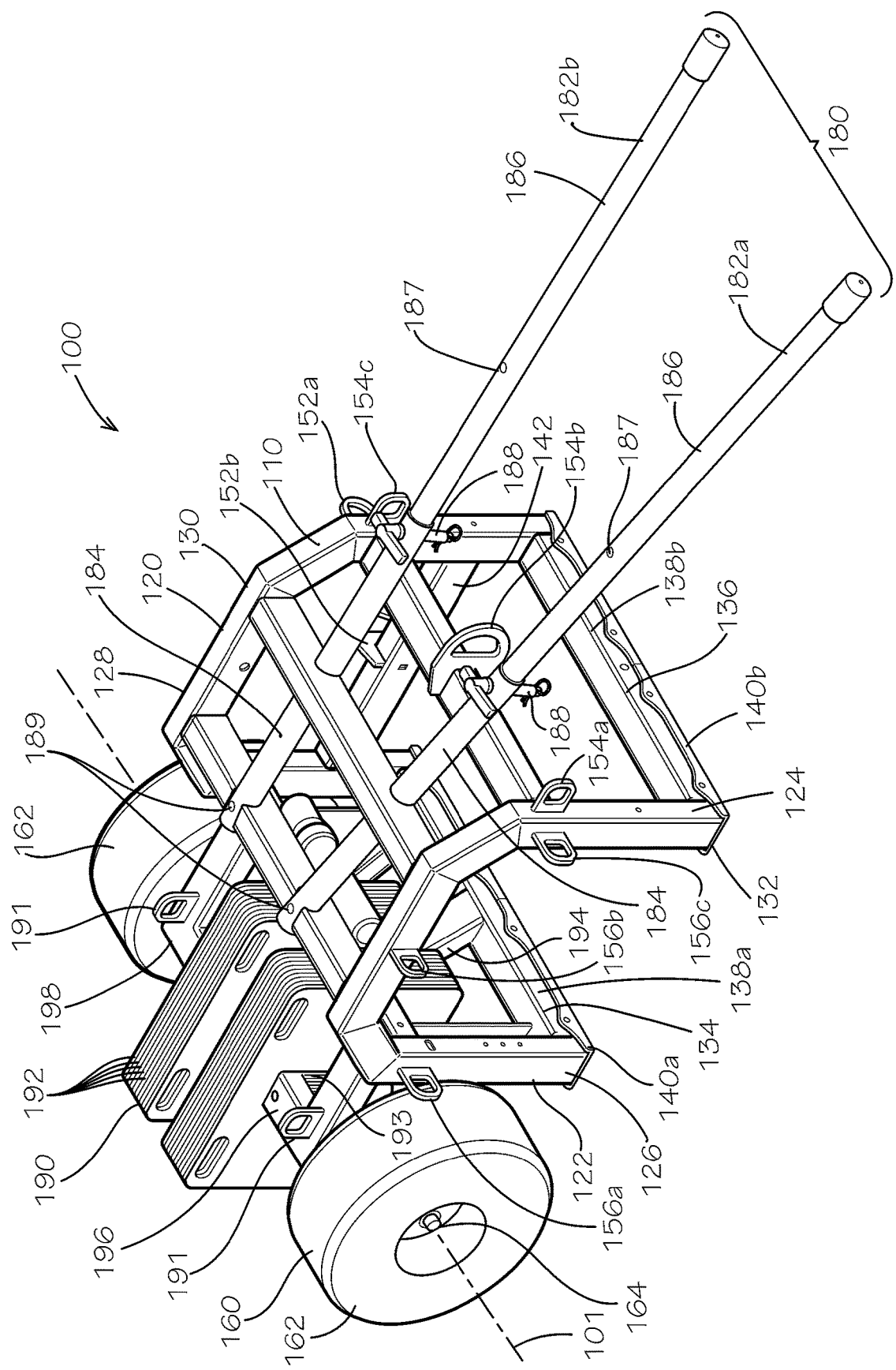
FIG. 1 is a perspective rear view of a mobile anchor cart assembly comprising a cart and a load in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a mobile anchor cart assembly and associated methods, systems, devices, and various apparatus. The mobile anchor cart assembly can comprise a cart and a load. It would be understood by one of skill in the art that the disclosed mobile anchor cart assembly is described in but a few exemplary aspects among many. No particular terminology or description should be considered limiting on the disclosure or the scope of any claims issuing therefrom.

FIG. 1 is a rear perspective view of a mobile anchor cart assembly 100 comprising a cart 110 and a load 190 in accordance with one aspect of the present disclosure. The cart 110 can comprise a frame 120, an axle assembly 160, and at least one handle 180. The frame 120 can define a front side 122 and a rear side 124. The front side 122 can be disposed opposite form the rear side 124. The frame can further define a left side 126 and a right side 128, and the left side 126 can be disposed opposite from the right side 128.

The frame 120 can further define a top side 130 and a bottom side 132, and the top side 130 can be defined opposite from the bottom side 132.

The frame 120 can comprise a front foot 134 and a rear foot 136. In the present aspect, the front foot 134 and the rear foot 136 can each extend from the left side 126 to the right side 128 of the frame 120. In other aspects, the front foot 134 and the rear foot 136 can extend from the front side 122 to the rear side 124 or any other suitable configuration. The front foot 134 can be disposed at the front side 122 of the frame 120, and the rear foot 136 can be disposed at the rear side 124 of the frame 120. The front foot 134 and the rear foot 136 can be disposed at the bottom side 132 of the frame 120.

Each foot 134,136 can comprise a foot bar 138a,b extending from the left side 126 to the right side 128 of the frame 120 and a foot pad 140a,b. The foot pads 140a,b can comprise a resilient and durable material demonstrating a high coefficient of friction. For example and without limitations, the foot pads 140a,b can comprise a rubber, elastomer, polymer or similar material. In some aspects, the foot pads 140a,b can comprise ethylene propylene diene monomer ("EPDM") rubber, polychloroprene ("Neoprene") rubber, or other natural or synthetic rubbers. In other aspects, the frame 120 can comprise four feet disposed at corners of the frame 120, and the four feet may or may not be connected front-to-rear or left-to-right by foot bars.

The cart 110 can further comprise at least one tie-off point. In the present aspect, the cart 110 can comprise three right tie-off points 152a,b,c (tie-off point 152c shown in FIG. 2), which can be attached to the right side 128 of the frame 120. Additionally, the cart 110 can comprise three rear tie-off points 154a,b,c, which can be attached to the rear side 124 of the frame 120. The cart 110 can further comprise three left tie-off points 156a,b,c, which can be attached to the left side 126 of the frame 120. The number of each type of tie-off points 152,154,156 should not be viewed as limiting, and in other aspects, the cart 110 can comprise greater or fewer tie-off points 152,154,156. In other aspects, the cart 110 may not comprise tie-off points 152,154,156 attached to each of the right side 128, the rear side 124, and the left side 126 of the frame 120. For example and without limitation, in some aspects, the cart 110 may not comprise any left tie-off points 156 attached to the left side 126 of the frame 120.

In the present aspect, the frame 120 can comprise a side bar 142 on the right side 128 of the frame 120, while the left side 126 of the frame 120 may not comprise a side bar. The side bar 142 can extend from the front side 122 to the rear side 124 of the frame 120. The right tie-off point 152b can be mounted on the side bar 142, between the top side 130 and the bottom side 132. In other aspects, the frame 120 may not comprise the side bar 142 on the right side 128. In such aspects, the right tie-off point 152b can be mounted near the top side 130 of the frame 120, similar to the left tie-off point 156b. In other aspects, the frame 120 can comprise a side bar (not shown) similar to the side bar 142 on the left side 126, either in addition to or instead of side bar 142. In such aspects, one or more of the left tie-off points 156a,b,c can be mounted on the side bar on the left side 126.

The tie-off points 152,154,156 can be configured to provide anchor points for workers subject to fall hazards on their job site. Workers can each clip their lanyards, or other fall protection equipment, into a different one of the tie-off points 152,154,156 to protect them from the fall hazard. Some of the tie-off points, such as 152b and 154b, can be configured to provide attachment for more than one worker, while other tie-off points, such as 152a,c, 154a,c, and 156a,b,c, can be configured to provide attachment for a single worker. As shown and further described below with respect to FIG. 4, the different tie-off points 152,154,156 can correspond to different directional work zones for the workers to work in.

The axle assembly 160 can be attached to the front side 122 of the frame 120. The axle assembly 160 can comprise at least one wheel 162. In the present aspect, the axle assembly 160 can comprise two wheels 162 for example and without limitation. In other aspects, the axle assembly 160 can comprise greater or fewer than two wheels 162. More wheels 162 can be desirable for distributing a weight of the mobile anchor cart assembly 100, while fewer wheels 162 can allow for greater maneuverability in some configurations.

The wheels 162 can be solid, such as hard rubber casters, or inflatable, such as rubber tires, for example and without limitation. The wheels 162 can be mounted on an axle shaft 164 of the axle assembly 160, and the axle shaft 164 can define an axle axis 101, about which the wheels 162 can rotate. The axle axis 101 can extend substantially perpendicularly from the left side 126 to the right side 128. In the present aspect, the cart 110 is shown in an anchored position, wherein both the front foot 134 and the rear foot 136 rest upon a ground surface (shown and described in further detail with respect to FIG. 3A). In the anchored position, the wheels 162 may not contact the ground surface or may make only minimal contact with the ground surface such that the wheels 162 do not bear significant weight in the anchored position.

The frame 120 can further comprise a weight rack 198 attached to the front side 122. The weight rack 198 can extend forward from the front side 122 of and away from the rear side 124. The weight rack 198 can comprise a weight bar 196 extending parallel to the axle axis 101, and the weight rack 198 can further comprise a truss 194 extending from the weight bar 196 to the foot bar 138a of the front foot 134. The truss 194 can provide structural support for the weight bar 196.

The weight rack 198 can comprise lifting points 191, which can be configured for lifting the mobile anchor cart assembly 100, such as with a crane. In the present aspect, the lifting points 191 may not be intended for use as tie-off points. To signal to workers not to anchor their fall protection systems to the lifting points 191, the lifting points 191 and the tie-off points 152,154,156 may define visual cues. For example and without limitation, the tie-off points 152, 154,156 can define a first color, such as with a paint or similar coating, and the lifting points 191 can define a second color that is different from the first color. For example and without limitation, the tie-off points 152,154, 156 can define a green color, and the lifting points 191 can define a red color. Additionally, indicia can be provided identifying the lifting points 191 and tie-off points 152,154, 156 through words and/or symbols, such as with labels, decals, etching, stamping, or other visual indications.

The load 190 can comprise a quantity of weight plates 192, and the weight plates 192 can rest upon the weight bar 196 on either side of the truss 194. A weight of the load 190 can be varied by changing the quantity of weight plates 192 (i.e. adding or removing weight plates 192 from the weight bar 196). In the present aspect, the weight plates 192 can each define a cutout 193, and the cutouts 193 can be sized to fit a cross-section of the weight bar 196. In the present aspect, the weight bar 196 can define a substantially rectangular or square cross-section, and the cutouts 193 can be substantially rectangular in shape to closely fit the cross-section of the weight bar 196. By fitting the shape of the cutouts 193 to the cross-section of the weight bar 196, the weight plates 192 can be prevented from swinging on the weight bar 196 in a front-to-back direction. In other aspects, the weight bar 196 may define a different cross-sectional shape, and the cutouts 193 may or may not be complementarily shaped to fit the cross-section of the weight bar 196.

As further described below with respect to FIGS. 3A-C and 4, the load 190 can define a load center of gravity $C_L$ (shown in FIG. 3A), and the load center of gravity $C_L$ can be vertically aligned with at least a portion of the axle assembly 160 in the anchored position. For example and without limitation, the load center of gravity $C_L$ can be positioned over the axle assembly 160. In the present aspect, the load center of gravity $C_L$ can be positioned directly over the axle shaft 164 of the axle assembly 160; however, in other aspects, the load center of gravity $C_L$ may be forward or rearward from the axle shaft 164. In some aspects, the load center of gravity $C_L$ is no further forward or rearward than a diameter of the wheels 162; however, in some aspects, particularly those with small diameter wheels 162, the load center of gravity $C_L$ may be farther forward or rearward than the diameter of the wheels 162. In some aspects, the axle axis 101 can extend through the load center of gravity $C_L$.

Returning to FIG. 1, the at least one handle 180 of the cart 110 can comprise a first handle 182*a* and a second handle 182*b*. The handles 182*a,b* can extend rearward from the rear side 124 of the frame 120 and away from the front side 122. The first handle 182*a* can be attached to the frame 120 closer to the left side 126, and the second handle 182*b* can be attached to the frame 120 closer to the right side 128. In the present aspects, the handles 182*a,b* can attach to the frame 120 at or near the top side 130 of the frame 120.

The handles 182*a,b* can be configured to allow a worker to lift upward on the handles 182*a,b* to place the cart 110 in a mobile position, as shown and further described below with respect to FIG. 3C. In the mobile position, neither the front foot 134 nor the rear foot 136 contacts the ground surface; however, the wheels 162 can contact the ground surface. In the mobile position, the mobile anchor cart assembly 100 can be pushed or pulled, similar to a wheel barrow. Because the load center of gravity $C_L$ can be vertically aligned with at least a portion of the axle assembly 160, a worker lifting the cart 110 to the mobile position by the handles 182*a,b* is not significantly burdened by the weight of the load 190. This configuration permits the worker to move the load 190 weighing up to several times his or her bodyweight.

In the present aspect, the handles 182*a,b* can be reconfigurable. Each handle 182*a,b* can comprise a frame tube 184, which can be attached to the frame 120, and an extension 186, which can be received by the respective frame tube 184. Each frame tube 184 can define at least one tube hole 189, and each extension 186 can define at least one extension hole 187. The handles 182*a,b* can each comprise a pin 188, which can extend through an aligned pair of tube holes 189 and extension holes 187 to fix the extensions 186 relative to the frame tubes 184. In the present view, the pins 188 are shown extending through a pair of aligned extension holes 187 and tube holes 189, which obscure the holes 187,189 from view. The pins 188 can be removed, which can permit the extensions 186 to be removed from the frame tubes 184, such as for transportation. Alternatively, the extensions 186 can be telescoped inwards into the frame tubes 184, and the pins 188 can be reinserted into the holes 187,189 to secure the handles 182*a,b* in a more compact, collapsed configuration. For example, if a worker attaches his or her fall protection system to one of the rear tie-off points 154*a,b,c*, the handles 182*a,b* can be collapsed so that they do not interfere with the worker's lanyard.

Figure 2:
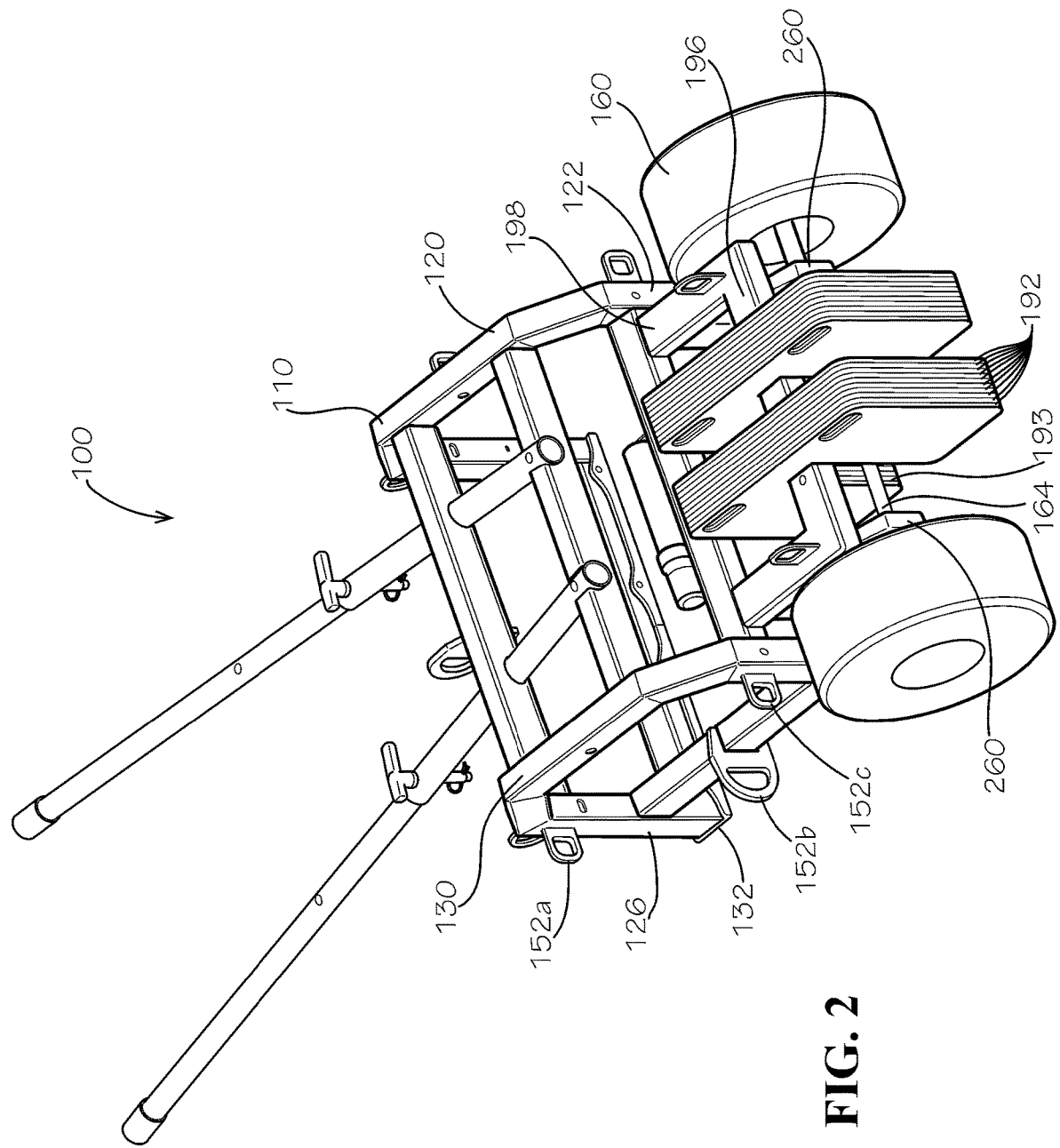
FIG. 2 is a front perspective view of the mobile anchor cart assembly of FIG. 1.

FIG. 2 is a front perspective view of the mobile anchor cart assembly 100 of the aspect of FIG. 1. The left side 126 of the frame 120 is shown, including the left tie-off points 152*a,b,c*. Tie-off point 152*b* can be larger and more robust than tie-off points 152*a,c*, and tie-off point 152*b* can be configured to secure larger, heavier potential loads than 152*a,c*. Because of this, the tie-off point 152*b* can be positioned lower on the frame 120 and closer to the bottom side 132 of the frame 120, such as on the side bar 142, while the tie-off points 152*a,c* can be positioned higher and closer to the top side 130 of the frame 120. When loads are applied to the tie-off points, overturn moments can be applied to the mobile anchor cart assembly 100. By utilizing the tie-off point 152*b* lower on the frame 120 for larger potential loads, the overturn moment can be reduced to prevent the mobile anchor cart assembly 100 from flipping over.

As shown, the axle assembly 160 can be attached to the front side 122 of the frame 120 by a pair of axle brackets 260. The axle brackets 260 can extend outwards from the front side 122 of the frame 120, and the axle shaft 164 can extend through the axle brackets 260 to attach the axle assembly 160 to the frame 120. In the present aspect, the axle shaft 164 can be positioned beneath the weight bar 196 of the weight rack 198, and the cutouts 193 of each weight plate 192 of the quantity of weight plates 192 can extend downwards on either side of the axle shaft 164 in the present aspect.

Figure 3A:
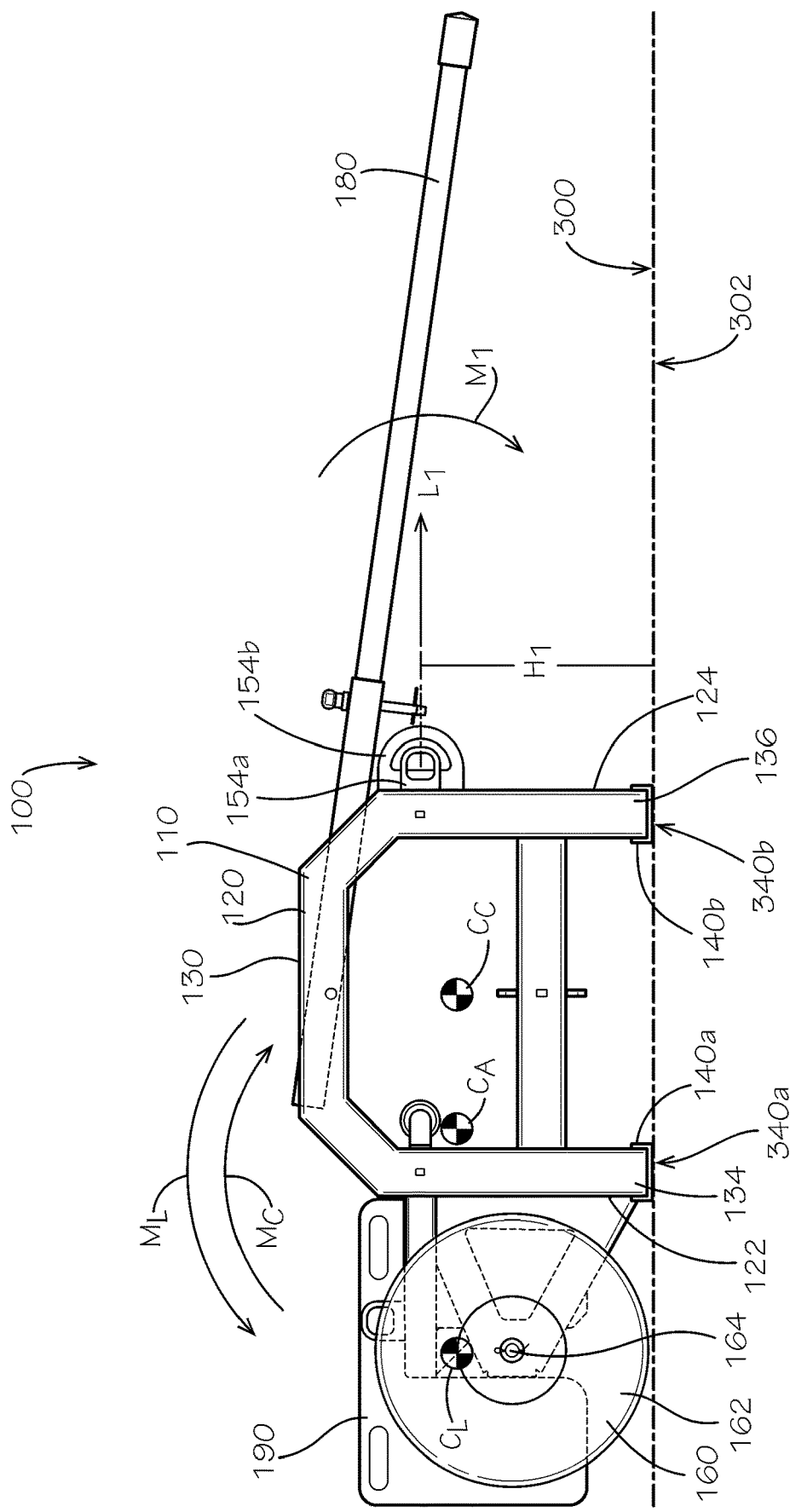
FIG. 3A is a side view of the mobile anchor cart assembly of FIG. 1 shown in an anchored position with at least one wheel of the cart shown in transparency.
Figure 3B:
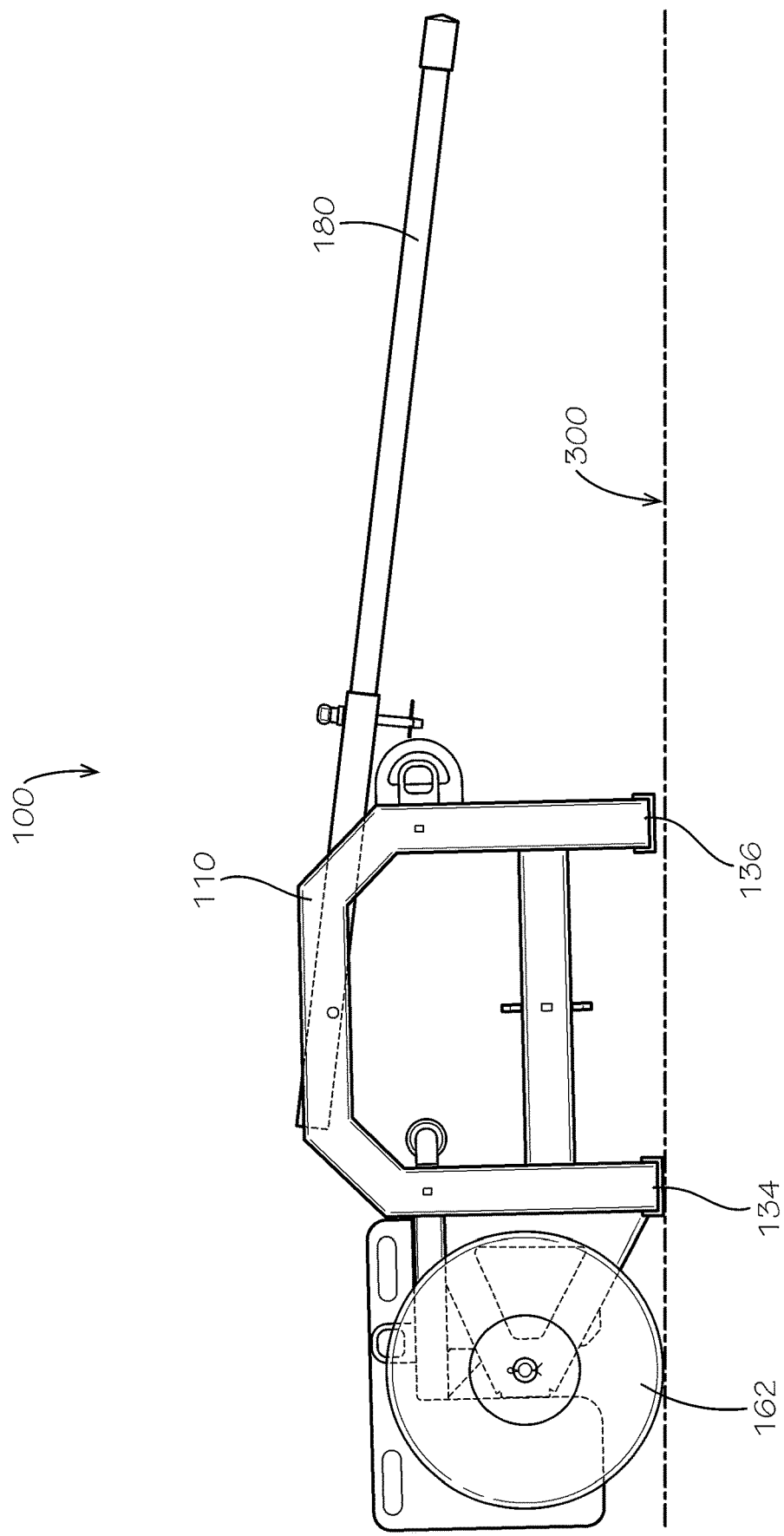
FIG. 3B is a side view of the mobile anchor cart assembly of FIG. 1 shown in a transition position with the at least one wheel of the cart shown in transparency.
Figure 3C:
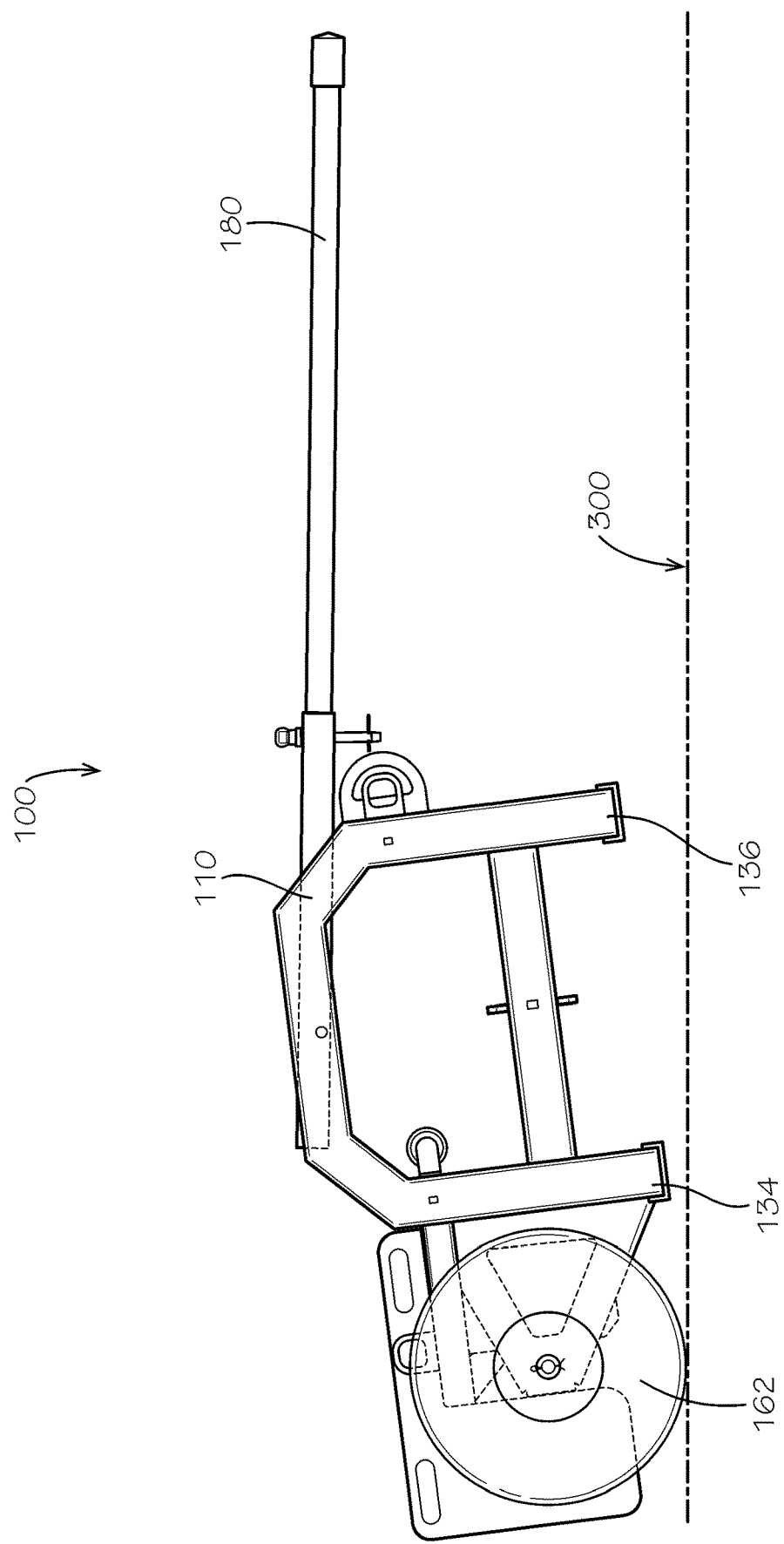
FIG. 3C is a side view of the mobile anchor cart assembly of FIG. 1 shown in a mobile position with the at least one wheel of the cart shown in transparency.

FIGS. 3A-C respectively demonstrate the anchored position, a transition position, and the mobile position of the cart 110 of the mobile anchor cart assembly 100 of FIG. 1, with the wheels 162 shown in transparency. FIG. 3A shows the cart 110 in the anchored position resting upon a flat ground surface 300. The front foot 134 can define a front foot surface 340*a*, and the rear foot 136 can define a rear foot surface 340*b*. The front foot surface 340*a* and the rear foot surface 340*b* can respectively be defined by the foot pads 140*a,b*. The front foot surface 340*a* and the rear foot surface 340*b* can be substantially coplanar with a foot plane 302. In the anchored position, the foot plane 302 can be coplanar with the flat ground surface 300 because the feet 134,136 rest upon the flat ground surface 300 in the anchored position.

As shown, the wheels 162 do not intersect or break the foot plane 302; therefore, the wheels 162 do not contact the flat ground surface 300 in the anchored position. As previously described, the load center of gravity $C_L$ can be vertically aligned with at least a portion of the axle assembly 160 in the present aspect. Specifically, the load center of gravity $C_L$ can be aligned with and above the axle shaft 164 in the present aspect. The cart 110 can define a cart center of gravity $C_C$, and the cart center of gravity $C_C$ can be positioned between the front foot 134 and the rear foot 136.

Because the cart center of gravity $C_C$ and the load center of gravity $C_L$ are positioned on opposite sides of the front foot 134, the front foot 134 can support a majority of the weight of the mobile anchor cart assembly 100, and the front foot 134 can act as the fulcrum or tipping point for the mobile anchor cart assembly 100. Specifically, a front edge of the front foot 134 located at the front side 122 can act as the fulcrum.

The following discussion of the forces acting on the mobile anchor cart assembly 100 refers to the perspective shown in FIGS. 3A-C. As depicted, the load center of gravity $C_L$ is positioned to the left of the front foot 134. This orientation causes the load center of gravity $C_L$ to exert a load moment $M_L$ acting in a counterclockwise direction about the front foot 134. The load moment $M_L$ can bias the mobile anchor cart assembly 100 toward the transition position shown in FIG. 3B, wherein the wheels 162 and the front foot 134 rest upon the flat ground surface 300 while the rear foot 136 does not contact the flat ground surface 300.

The cart center of gravity $C_C$ is positioned to the right of the front foot 134, and therefore, the cart center of gravity $C_C$ exerts a cart moment $M_C$ acting in a clockwise direction about the front foot 134. The cart moment $M_C$ can be larger than the load moment $M_L$, and therefore, the cart moment $M_C$ and the load moment $M_L$ acting together bias the cart 110 towards the anchored position shown. Consequently, an assembly center of gravity CA for the mobile anchor cart assembly 100 as a whole can be positioned between the front foot 134 and the rear foot 136, or in some aspects, the assembly center of gravity CA can be vertically aligned over the front foot 134. The exact position varies based on the weight of the load 190, as further described below. However, the assembly center of gravity CA can be positioned closer to the front foot 134 than the cart center of gravity $C_C$. By positioning the assembly center of gravity CA close to the front foot 134, the upward force on the at least one handle 180 required to lift the cart 110 to the mobile position (shown in FIG. 3C) is minimized.

Similarly, the rear tie-off points 154a,b,c (154c shown in FIG. 1) can be positioned higher on the frame 120 near the top side 130. The centers of the rear tie-off points 154a,b,c can be at a height $H_1$. Because the tipping point for the cart 110 is where the front foot 134 contacts the flat ground surface 300, the height $H_1$ acts as a moment arm for a rear tie-off load $L_1$ acting in a horizontal direction. Consequently, the rear-tie off load $L_1$ generates a clockwise moment $M_1$, which biases the cart 110 toward the anchored position, thereby placing more weight on the rear foot 136 and keeping the wheels 162 off the flat ground surface 300. In doing so, the rear tie-off load $L_1$ can be resisted by friction from the foot pads 140a,b rather than the wheels 162, which would have a tendency to roll in the direction of the rear tie-off load $L_1$. Therefore, if a worker attached to one of the rear tie-off points 154a,b,c falls, his or her fall protection system will exert the rear tie-off load $L_1$, which will further bias the mobile anchor cart assembly 100 to the anchored position and prevent movement of the mobile anchor cart assembly 100 relative to the flat ground surface 300.

The weight of the load 190 can be increased to provide fall protection for more workers. The ability of the mobile anchor cart assembly 100 to resist a lateral load (applied substantially horizontal and parallel to the flat ground surface 300) depends upon friction between the foot pads 140a,b and the flat ground surface 300. On a flat surface, the maximum friction force to resist the lateral load can be equal to a weight of the mobile anchor cart assembly 100 (the cart 110 and the load 190 combined) multiplied by a static friction coefficient between the material of the foot pads 140a,b and the flat ground surface 300. For example and without limitation, in an aspect wherein the foot pads 140a,b comprise EPDM rubber, the static friction coefficient between the foot pads 140a,b and common ground surfaces, such as concrete, can be approximately 0.66. Therefore, for example and without limitation, if the weight of the mobile anchor cart assembly 100 were 1000 lbs, the maximum friction force to resist the lateral load would be 660 lbs. In other aspects, the weight of the mobile anchor cart assembly 100 can be higher or lower than 1000 lbs, and the static friction coefficient of the foot pads 140a,b can be higher or lower than 0.66.

The maximum friction force required depends upon how many workers are attached to the mobile anchor cart assembly 100 because the mobile anchor cart assembly 100 must be capable of arresting multiple workers in the event that the workers fell simultaneously. Therefore, the weight of the load 190 can be increased or decreased to accommodate greater or fewer workers. Changing the weight of the load 190 can change a position of the assembly center of gravity CA for the mobile anchor cart assembly 100. Increasing the weight of the load 190 can move the assembly center of gravity CA forward towards the front foot 134, while decreasing the weight of the load 190 can move the assembly center of gravity CA rearward towards the rear foot 136. At its maximum design weight for the load 190, the assembly center of gravity CA can be positioned either directly over or rearward of the front foot 134 to bias the cart 110 toward the anchored position as described above.

FIG. 3B shows the cart 110 in the transition position, wherein the wheels 162 and the front foot 134 are in contact with the flat ground surface 300, while the rear foot 136 is raised above the flat ground surface 300. The transition position demonstrates how the front foot 134 can act as a fulcrum for the cart 110 when moving between the positions. The cart 110 can be placed in the transition position by exerting an initial upward force on the at least one handle 180. If the worker ceases to apply the initial upward force to the at least one handle 180, the cart 110 will settle back to the anchored position shown in FIG. 3A. If the worker sufficiently increases the upward force, the cart 110 can be placed in the mobile position, shown in FIG. 3C.

In the mobile position, the at least one wheel 162 rests on the flat ground surface 300, and both the front foot 134 and the rear foot 136 are raised above the flat ground surface 300. In this position, a worker holding the at least one handle 180 can push the cart 110 forwards and backwards, as well as turn. In this position, the worker can easily reposition the mobile anchor cart assembly 100 on a job site, such as to provide fall protection for work in a different area of the job site, as further described below with respect to FIG. 4.

Figure 4:
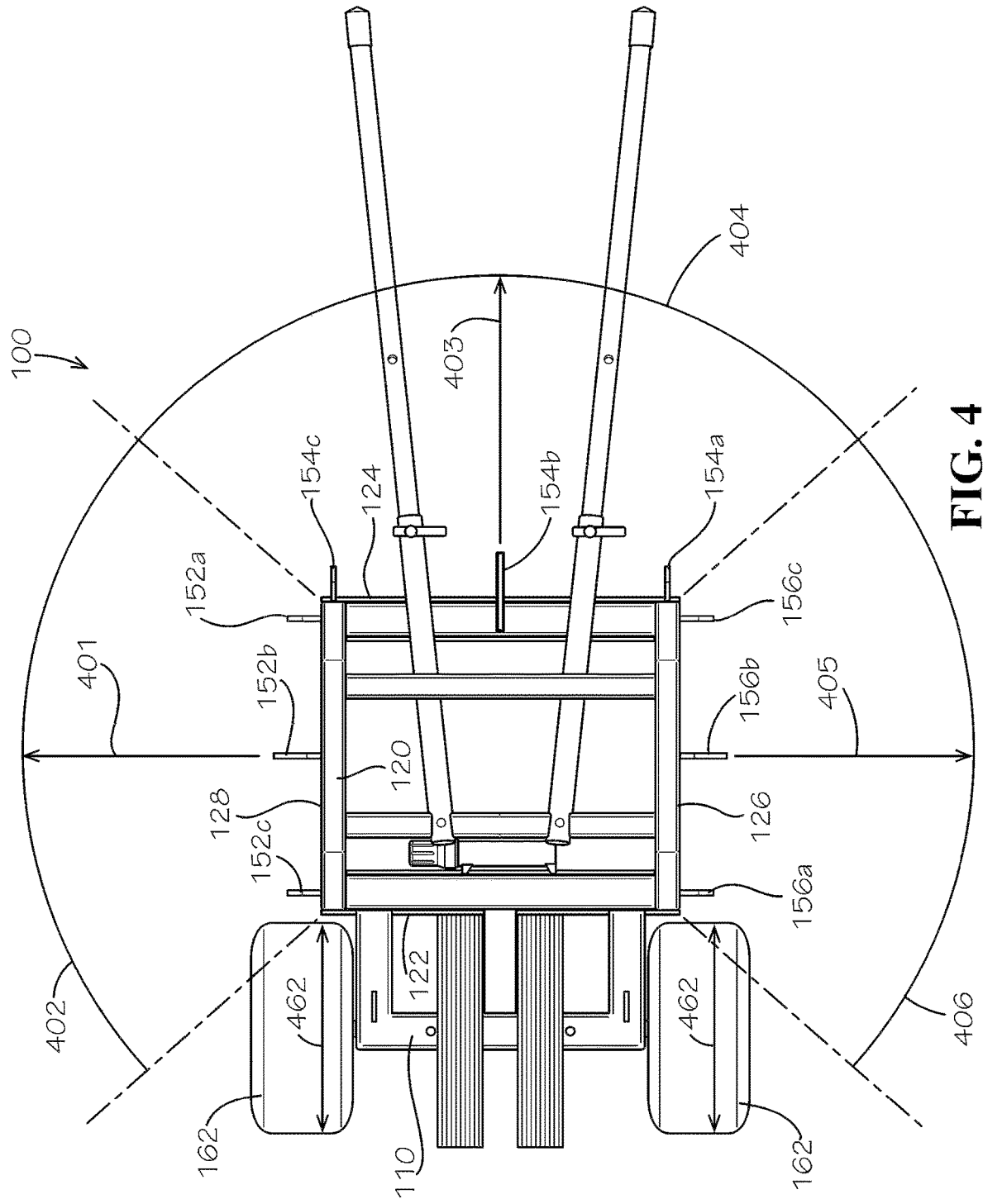
FIG. 4 is an overhead view of the mobile anchor cart assembly of FIG. 1 in the anchored position.

FIG. 4 is an overhead view of the mobile anchor cart assembly 100 in the anchored position. In the present aspect, the cart 110 can be configured to provide tie-off protection to workers in three different directions 401,403,405, each corresponding to a different directional work zone 402,404, 406.

A first direction 401 can extend perpendicularly outward from the right side 128 of the frame 120, and the first direction 401 can correspond to a first directional work zone 402. Workers who will be working in the first directional work zone 402 can attach their fall protection system to one of the right tie-off points 152a,b,c to be protected from fall hazards in the first directional work zone 402.

A second direction 403 can extend perpendicularly outward from the rear side 124 of the frame 120, and the second direction 403 can correspond to a second directional work zone 404. Workers who will be working in the second directional work zone 404 can attach their fall protection system to one of the rear tie-off points 154a,b,c to be protected from fall hazards in the second directional work zone 404.

A third direction 405 can extend perpendicularly outward from the left side 126 of the frame 120, and the third direction 405 can correspond to a third directional work zone 406. Workers who will be working in the third directional work zone 406 can attach their fall protection system to one of the left tie-off points 156a,b,c to be protected from fall hazards in the third directional work zone 406.

The second direction 403 and second work directional zone 404 can be substantially perpendicular to the first and third directions 401,405 and first and third directional work zones 402,406, respectively. The first direction 401 and first directional work zone 402 can extend substantially opposite from the third direction 405 and third directional work zone 406.

In the present aspect, each of the directional work zones 402,404,406 can be approximately ninety-degrees centered relative to the respective work directions 401,403,405; however, some overlap is permissible. For example and without limitation, a worker tied off to the rear tie-off point 154c can work in at least some portions of the first directional work zone 402, or a worker tied off to the right tie-off point 152a can work in at least some portions of the second directional work zone 404. However, as a best practice to avoid potential entanglement of lanyard lines, a worker can tie off to the tie-off points 152,154,156 facing the respective directional work zone 402,404,406 in which he or she will be working.

In the present aspect, the mobile anchor cart assembly 100 can provide 270-degrees of fall protection coverage; however, in other aspects, the mobile anchor cart assembly 100 can provide greater or fewer than 270-degrees of fall protection coverage. For example and without limitation, some aspects may lack the left tie-off points 156a,b,c. In such aspects, the mobile anchor cart assembly 100 may only provide 180-degrees of fall protection coverage over the first and second directional work zones 402,404.

As shown, each of the wheels 162 can be configured to roll in a forward-rearward rolling direction 462 relative to the front side 122 and rear side 124 of the frame 120. Unlike other available anchor carts that only provide fall protection coverage substantially perpendicular to the rolling direction of the wheels, the mobile anchor cart assembly 100 can provide fall protection substantially parallel to the rolling direction 462 of the wheels 162. The mobile anchor cart assembly does so without requiring a braking system for the wheels 162 because the mobile anchor cart assembly 100 is biased towards the anchored position. Unlike a braking system which can fail and relies upon workers to properly engage, the mobile anchor cart assembly 100 automatically assumes the anchored position, ready to provide safe anchoring tie-off points for the worksite. This reduces the potential for accidents related to improper anchoring and failure to follow procedures.

In practice, a worker can lift the cart 110 to the mobile position and then roll the mobile anchor cart assembly 100 into position on a worksite. The worker can orient the mobile anchor cart assembly 100 so that one or more of the directional work zones 402,404,406 will be directed towards one or more fall hazards on the worksite, and the worker can then place the cart 110 in the anchored position by lowering the at least one handle 180 of the cart 110.

For example and without limitation, if the worker plans to work on an unprotected corner of a building which is under construction, the worker can orient the mobile anchor cart assembly 100 so that one directional work zone, such as the first directional work zone 402, is directed at a first edge of the corner, and another directional work zone, such as the second directional work zone 404, is directed at a second ledge of the corner. A first worker can then attach his or her fall protection system to one of the tie-off points associated with the first directional work zone 402, such as right tie-off points 152a,b,c, and a second worker than attach his or her fall protection system to one of the tie-off points associated with the second directional work zone 404, such as rear tie-off points 154a,b,c. Once attached as described, the two workers could then commence work in two different directional work zones, or in the same directional work zone if the task requires more than one worker at a time.

Alternatively, the second directional work zone 404 could be oriented towards the corner with the first directional work zone 402 directed at the first edge and the third directional work zone 406 directed at the second edge. Such a configuration can provide 270-degrees of fall protection over the corner and permit work in up to three different direction work zones 402,404,406 at the same time. If a single task requires more than one worker, both workers can attach their fall protection systems to tie-off points corresponding to the same directional work zone 402,404,406, and then both workers can work in the same directional work zone 402, 404,406 at the same time.

Figure 5:
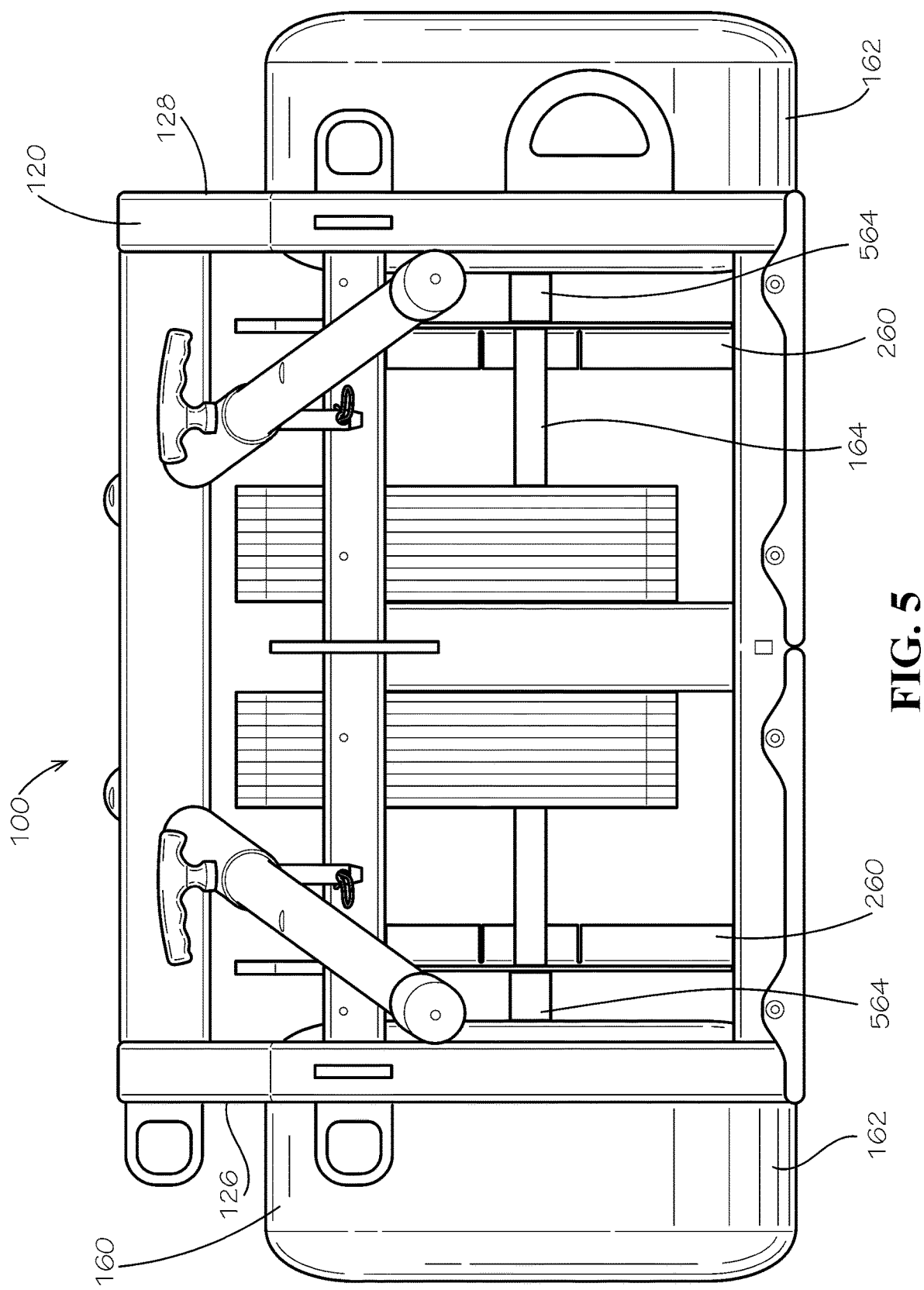
FIG. 5 is a rear view of the mobile anchor cart assembly of FIG. 1 in the anchored position.
Figure 6:
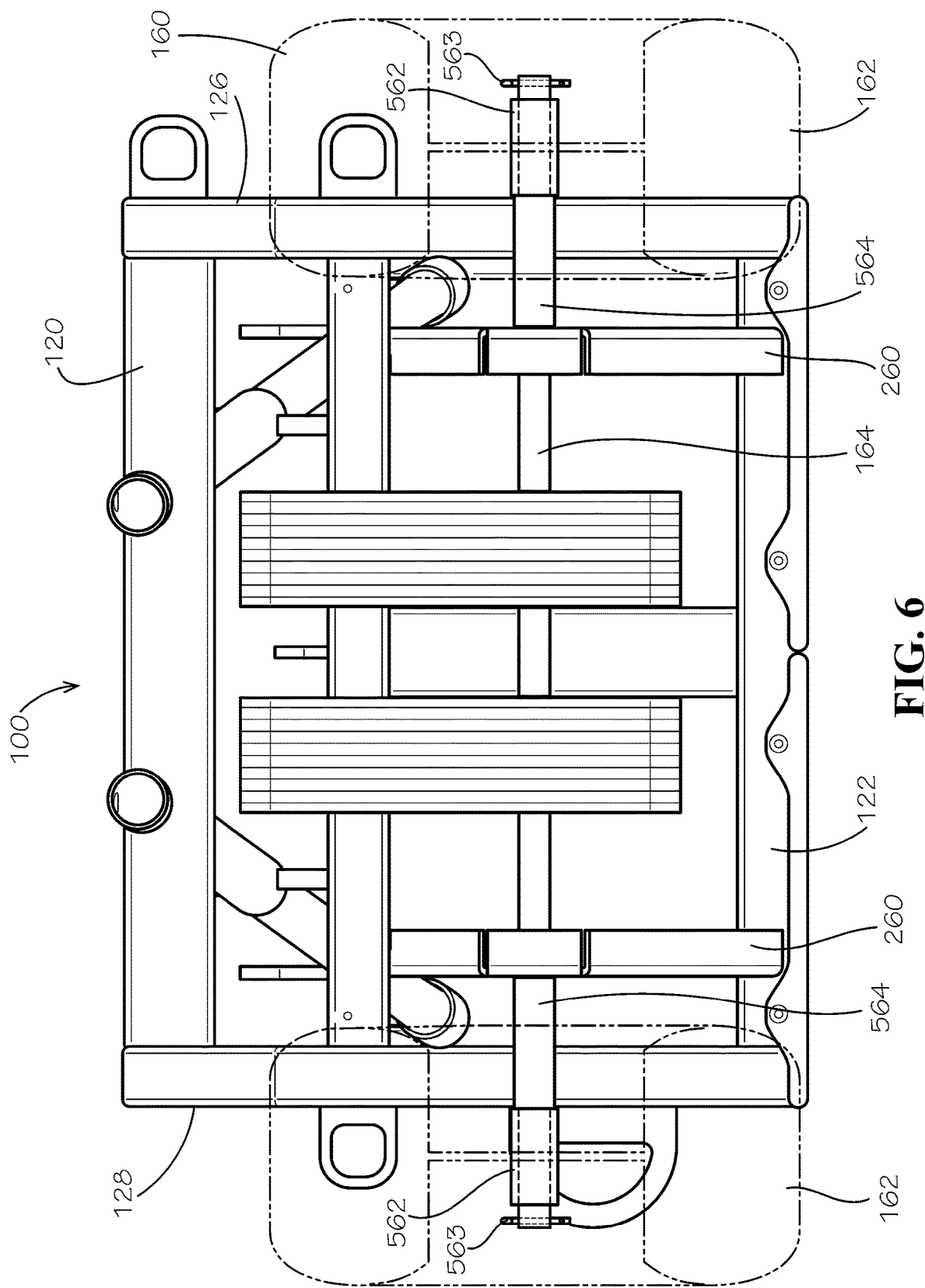
FIG. 6 is a front view of the mobile anchor cart assembly of FIG. 1 in the anchored position with the at least one wheel shown in transparency.

FIG. 5 is a rear view of the mobile anchor cart assembly 100 in the anchored position, and FIG. 6 is a front view of the mobile anchor cart assembly 100 in the anchored position, with the wheels 162 shown in transparency. As previously described, the axle assembly 160 can be attached to the front side 122 of the frame 120 by the pair of axle brackets 260. Each one of the axle brackets 260 can comprise an axle tube 564. The axle tubes 564 can extend outwards from the respective axle bracket 260 and toward either the left side 126 or the right side 128 of the frame 120. The axle shaft 164 can extend through each of the axle tubes 564, and the axle tubes 564 and axle brackets 260 can support the axle shaft 164. In the present aspect, the axle shaft 164 can be configured to rotate relative to the axle tubes 564; however, in other aspects, the axle shaft 164 can be rotationally fixed relative to the axle tubes 564.

The axle tubes 564 can act as spacers between each axle bracket 260 and the adjacent wheel 162. As shown in FIG. 6, each wheel 162 can comprise a wheel hub 562, and the axle shaft 164 can extend through the wheel hubs 562. The wheel hubs 562 can rotate freely relative to the axle shaft 164 in the present aspect. Each wheel hub 562 can be retained on the axle shaft 164 by a retention device 563. In the present aspect, the retention devices 563 can be cotter pins. In other aspects, the retention devices 563 may be a nut, such as a castle nut, C-clip, or another type of fastener, for example and without limitation.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A mobile anchor cart assembly comprising:
    a cart comprising:
        a frame defining a front side and a rear side, the front side disposed opposite from the rear side, the frame defining a front foot and a rear foot, the front foot and the rear foot configured to rest upon a ground surface when the cart is in an anchored position, the front foot and the rear foot configured to clear the ground surface when the cart is in a mobile position;
        at least one tie-off point attached to the frame;
        at least one handle extending outward from the rear side of the frame, the at least one handle configured to selectively position the cart about and between the anchored position and the mobile position; and
        an axle assembly mounted on the front side; and
    a load defining a load center of gravity, the load center of gravity being vertically aligned with the axle assembly when the cart is in the anchored position.

2. The mobile anchor cart assembly of claim 1, wherein:
    the front foot is disposed at the front side of the frame;
    the cart defines a cart center of gravity;
    the cart center of gravity exerts a cart moment about the front foot;
    the load center of gravity exerts a load moment about the front foot; and
    the cart moment and the load moment are sized to bias the cart towards the anchored position.

3. The mobile anchor cart assembly of claim 1, wherein:
    the load defines a weight;
    the load comprises a quantity of weight plates; and
    the weight of the load is configured to vary by increasing or decreasing the quantity of weight plates.

4. The mobile anchor cart assembly of claim 3, wherein:
    the frame comprises a weight rack attached to the front side; and
    at least one weight plate of the quantity of weight plates rests upon the weight rack.

5. The mobile anchor cart assembly of claim 1, wherein:
    the frame defines a left side and a right side;
    the left side is disposed opposite from the right side;
    a first tie-off point of the at least one tie-off point is attached to the rear side;
    the first tie-off point is configured to provide tie-off protection for a first worker in a first directional work zone;
    a second tie-off point of the at least one tie-off point is attached to either the right side or the left side; and
    the second tie-off point is configured to provide tie-off protection for a second worker in a second directional work zone substantially perpendicular to the first directional work zone.

6. The mobile anchor cart assembly of claim 5, wherein:
    the second tie-off point is attached to the right side;
    a third tie-off point is attached to the left side; and
    the third tie-off point is configured to provide tie-off protection for a third worker in a third directional work zone positioned opposite from the second direction work zone.

7. The mobile anchor cart assembly of claim 1, wherein:
    the mobile anchor cart assembly defines an assembly center of gravity of the load and the cart; and
    the assembly center of gravity of the load and the cart is between the front foot and the rear foot.

8. A cart comprising:
    a frame defining a front side and a rear side, the front side disposed opposite from the rear side, the frame defining a front foot and a rear foot, the front foot and the rear foot configured to rest upon a ground surface when the cart is in an anchored position, the front foot and the rear foot configured to clear the ground surface when the cart is in a mobile position, the frame comprising a weight rack attached to the front side, the weight rack comprising a weight bar configured to support a load;
    at least one tie-off point attached to the frame;
    at least one handle extending outward from the rear side of the frame, the at least one handle configured to selectively position the cart about and between the anchored position and the mobile position; and
    an axle assembly mounted on the front side, the weight bar configured to position a load center of gravity of the load vertically aligned with the axle assembly when the load is supported on the weight bar and the cart is positioned in the anchored position.

9. The cart of claim 8, further comprising at least one lifting point attached to the frame, and wherein:
    the at least one lifting point is a first color;
    the at least one tie-off point is a second color; and
    the first color is different from the second color.

10. The cart of claim 8, wherein:
    the front foot defines a front foot surface;
    the rear foot defines a rear foot surface;
    the front foot surface and the rear foot surface are each substantially coplanar with a foot plane;
    the axle assembly comprises at least one wheel; and
    the wheel does not intersect the foot plane.

11. The cart of claim 10, wherein:
    the axle assembly comprises an axle shaft;
    the axle shaft defines an axle axis;
    an axle height is defined between the axle axis and the foot plane;
    a first tie-off point of the at least one tie-off point is attached to the rear side;
    a first tie-off height is defined between the first tie-off point and the foot plane; and
    the first tie-off height is greater than the axle height.

12. The cart of claim 8, wherein:
    the axle assembly is configured to roll in a forward direction and a backward direction when the cart is in the mobile position;
    the forward direction extends from the rear side to the front side;
    the backward direction extends from the front side to the rear side; and a first tie-off point of the at least one tie-off point is attached to the rear side.

13. The cart of claim 12, wherein:
the frame defines a left side and a right side;
the axle assembly comprises at least one wheel;
the axle assembly comprises an axle shaft;
the axle shaft defines an axle axis extending from the left side to the right side; and
the at least one wheel rotates about the axle axis.

14. The cart of claim 8, wherein the at least one tie-off point is configured to provide 270-degrees of fall protection.

15. The cart of claim 8, wherein:
the frame defines a left side and a right side;
the left side is positioned opposite from the right side; and
the front foot extends from the left side to the right side.

16. A method for using a mobile anchor cart assembly, the method comprising:
moving the mobile anchor cart assembly to a worksite in a mobile position, the mobile anchor cart assembly comprising a cart and a load, the load defining a load center of gravity, the cart rolling on at least one wheel of an axle assembly of the cart in the mobile position along a ground surface of the worksite, the cart comprising a frame and a first tie-off point attached to a first side of the frame, the frame comprising a front foot and a rear foot, the front foot and the rear foot clearing the ground surface in the mobile position, a first direction extending perpendicularly outward from the first side of the frame, a first directional work zone corresponding to the first direction;
directing the first directional work zone toward a fall hazard of the worksite;
repositioning the mobile anchor cart assembly from the mobile position to an anchored position, the front foot and the rear foot resting on the ground surface of the worksite in the anchored position, the at least one wheel raised above the ground surface in the anchored position, the load center of gravity being vertically aligned with the axle assembly when the cart is in the anchored position; and
attaching a fall protection system of a first worker to the first tie-off point.

17. The method of claim 16, further comprising:
attaching a fall protection system of a second worker to a second tie-off point of the cart, the second tie-off point attached to a second side of the frame, a second direction extending perpendicularly outward from the second side of the frame, a second directional work zone corresponding to the second direction; and
increasing a weight of the load of the mobile anchor cart assembly, the load supported by a weight rack of the frame of the cart.

18. The method of claim 17, wherein:
the fall hazard is a first fall hazard;
the worksite defines a second fall hazard; and
the method further comprises directing the second directional work zone to the first fall hazard or the second fall hazard.

19. The method of claim 17, wherein the first direction is substantially perpendicular to the second direction, and the first directional work zone is substantially perpendicular to the second directional work zone.

20. The method of claim 16, wherein:
the frame defines a front side and a rear side;
the at least one wheel is configured to roll in a forward-rearward rolling direction relative to the front side and the rear side of the frame; and
the first side is the rear side of the frame.

* * * * *